United States Patent Office.

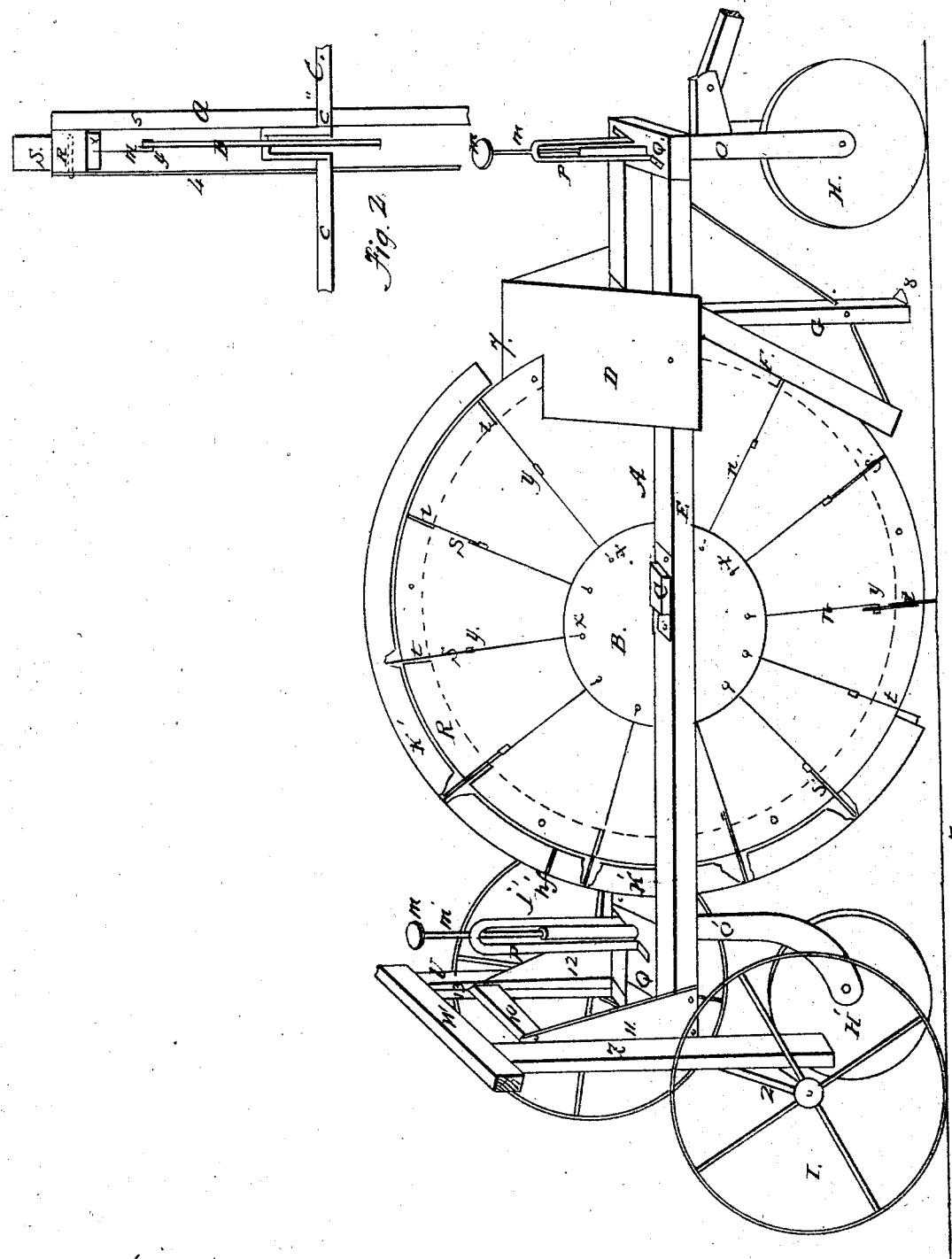

WILLIAM GAUSE, OF GREENSBORO, INDIANA.

Letters Patent No. 74,338, dated February 11, 1868.

IMPROVED DITCHING-MACHINE.

The Schedule referred to in these Letters Patent and making part of the same.

TO ALL WHOM IT MAY CONCERN:

Be it known that I, WILLIAM GAUSE, of Greensboro, in the county of Henry, and State of Indiana, have invented a new and useful Improvement on a Ditching-Machine, for cutting ditches and removing the earth therefrom; and I do hereby declare that the following is a full, clear, and exact description of the construction and operation of the same, reference being had to the annexed drawings, making a part of this specification, in which—

Figure 1 is a perspective view, and

Figure 2 a detached sectional view of certain parts, the same letter being used to represent identical parts.

In fig. 1, A is a large wheel, with its periphery pierced with mortises $t\ t\ t$, &c., for the working of the spades S S S, &c. In the drawing, the front face of the wheel is removed, in order to show the internal arrangement of the various parts.

B is a small wheel inside of the large wheel A, with its centre at 3, to the left of the centre, $c$, of wheel A, both wheels working loosely on the axle C, fig. 2—the large one on straight part, $c$, and the small wheel B on crank 6. The axle is stationary, with its crank in a horizontal position. The spades S S S, &c., are attached to the inner wheel, B, by arms $n\ n\ n$, &c., and their pivots or hooks $y\ y\ y$, &c., $x\ x\ x$, &c.

As the wheels A and B both revolve in the same direction, and with same velocity, and as the spades and arms are of uniform length, the two wheels, A and B, having different centres, the difference being equal to the distance it is required that the spades should project from the face of wheel A at the point of greatest projection, it follows that, as the wheels A and B revolve, the spades S S, &c., are drawn within the wheel A at front, and are projected at rear, and also at bottom and top of the wheel, in a less degree. These wheels A and B work, as before stated, on the compound crank $c\ 6\ c$, in fig. 2. This crank or axle is supported, as is the rest of the machine, in the frame E, fig. 1.

D is a scraper or slide, and serves to keep wheel A clean, and also receives the earth on its surface as it is removed from the ditch, and deposits it on each side of the ditch. The power is attached to the pole T. The wheel H runs in ditch.

G is a cutter or plough that loosens the earth, and prepares it for removal by the spades S S, &c. It has a bottom cutter, 8, and the sides, G, also act to cut the sides of the ditch. Where a V-shaped ditch is desired, the cutter F, made in a V-shape, is attached in rear of cutter G. The earth being cut and loosened by these cutters, the spades S S S, &c., press into it, and, being of nearly the width of the ditch, force the earth back and into the guide K, which is attached to and fits wheel A in rear, and carries it on, up, and over the wheel A, and empties it on top of the A-shaped scraper or slide, and it falls off to the sides, as before stated. The sides of the guide K are partly cut away, to show position of the spades. The guide K' is hinged at $h$, so as to be more readily adjustable, or facilitate its removal or the removal of any obstructions.

The wheels H H run in the ditch, and the machine is lowered or raised by means of the screws $m'\ m'$, working in the uprights P P', and engaging with the shank of the jaws O O, in which the wheels H H work, said shanks projecting up through the ends of the frame E.

At the rear of the machine, the frame 10 11 12 works in grooves 13, in uprights of frame Z W V, which is supported by the wheels I I, on axle 2. This suffers the machine to run over any surface obstruction without throwing it out of the ditch or in any way interfering with the work, the machine sliding up and down freely in grooves 13 13, or vice versa, the frame Z W V, and axle 2, and wheels I I sliding up and down on tenons or ends of cross-beam, 10, of the frame 10 11 12.

Q Q are cross-pieces or platform at end of frame E. R is the periphery of wheel A, made of sufficient size to receive mortises $t\ t$, &c., for spades S S, &c.

In fig. 2, a sectional view of the fixed axle $c\ c$, shank 6, and relative position of centres of the wheels A and B are given; also, mode of attachment of spades. C'' is the centre of the outer wheel, A; 6 is the centre of the inner wheel, B; 4 and 5 represent the two sides of the wheel, A; R, the periphery of A, which is pierced to receive spades S.

I disclaim the wheels A and B, except as below set forth; also, I disclaim the modes used for lowering or raising the machine, viz, screws $m\ m'$, uprights P P', jaws and shanks O O'. I also disclaim the slide or scraper D, and all other parts not herein claimed directly.

What I claim as my invention, and desire to secure by Letters Patent, is—

1. I claim the wheel A, with its periphery R, fig. 1, pierced for spades S S, &c., and working on fixed axle $c$, and the wheel or disk B, with its centre to the one side of the centre of wheel A, the difference equal to the greatest projection of the spades S S, &c., working on same shaft or axle, with curved crank, substantially as and for the purposes set forth.

2. I claim the movable spades S S, &c., arms $n\ n\ n$, &c., connected with disk or wheel B, fig. 1, in such a manner that, as the two wheels, A and B, rotate in the same direction, on a fixed axis on different centres, the spades S S, &c., recede from the front of wheel A, and project from bottom, top, and rear of said wheel, substantially as and for the purposes set forth.

3. I claim the wheels H H', in combination with a ditching-machine, combined and arranged as herein described.

4. I claim the arrangement of the frame 10 11 12, with cross-beam 10, sliding in grooves 13 13, in frame Z W V, supported by axle 2, and wheels I I', giving a sliding motion to a machine, up or down, and *vice versa* to frame Z W V, substantially as and for the purposes set forth.

5. I claim the hinged and adjustable guide K K', fig. 1, in combination with the wheel A.

6. I claim the movable and V-shaped cutter F, fig. 1, when combined with a ditching-machine, constructed and arranged as herein described.

WILLIAM GAUSE.

Witnesses:
ROBERT L. POLK,
WILL M. WATKINS.